Mar. 27, 1923.  1,449,764
V. E. LA POINTE
BROACH
Filed July 9, 1921
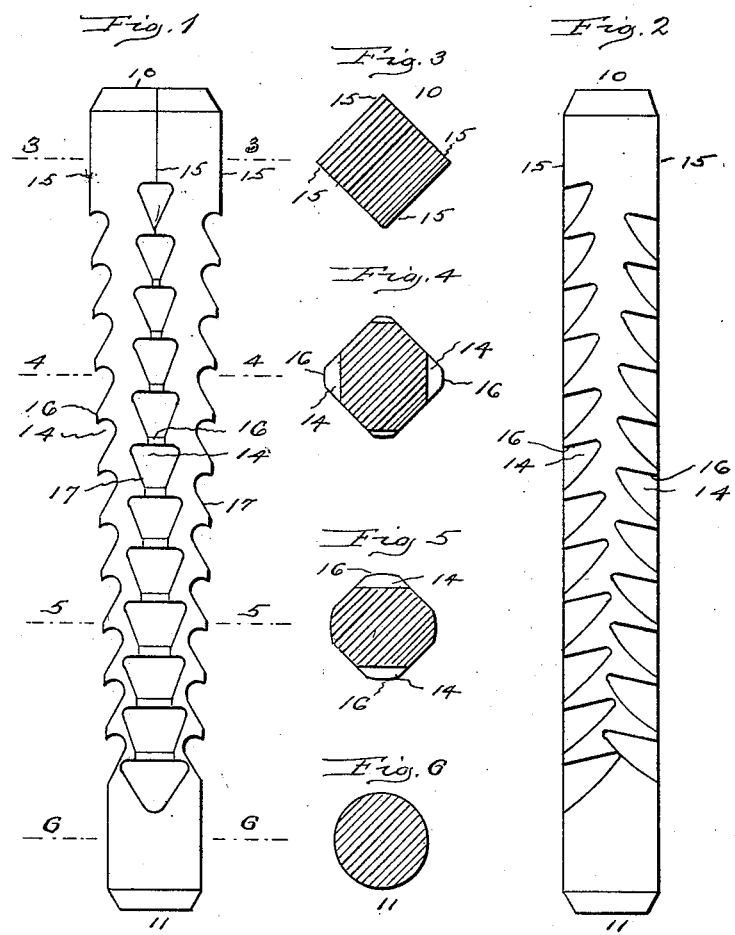
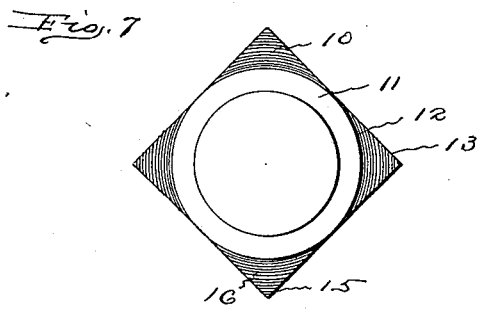
Inventor:
Victor E. La Pointe
Harry R. Williams
atty.

Patented Mar. 27, 1923.

1,449,764

UNITED STATES PATENT OFFICE.

VICTOR E. LA POINTE, OF HARTFORD, CONNECTICUT.

BROACH.

Application filed July 9, 1921. Serial No. 483,441.

*To all whom it may concern:*

Be it known that I, VICTOR E. LA POINTE, a subject of Great Britain, residing at Hartford, in the county of Hartford and State of Connecticut, have invented a new and useful Improvement in Broaches, of which the following is a specification.

This invention relates to those tools known as broaches or drifts which have shearing teeth and are designed to be pushed or pulled through drilled holes in metallic plates for the purpose of changing the circular walls of the holes to angular walls and forming square or rectangular openings.

The object of the invention is to provide a pushing or pulling tool of this class for broaching square or rectangular holes, which is simpler and cheaper to make and keep sharp, which is stronger, easier to drive, and has greater capacity, and which is less liable to cause a thin plate to drift or slide sidewise when operated upon, and thus is more reliable and accurate, than those tools now in common use for the same purpose.

This object is attained by taking a bar of steel which increases in size from circular and substantially the diameter of the drilled hole, at one end, to angular of a size and shape of the finished hole, at the other end, and forming milling cuts across the angular edges of the bar in such manner that the teeth which face the round end are staggered, that is, those teeth which are formed on adjacent edges are in different planes, whereby the milling cuts may be made deep so as to provide large chip spaces without weakening the teeth or reducing the cross sectional area of the bar at any point sufficiently to render it fragile. and so that lands will be left about all sides of the bar in positions that will prevent a thin plate from drifting or slipping sidewise when a cut is being made. as occurs if the teeth around the bar are in the same plane, thus ensuring that the angular hole formed has the same center as the round hole.

In the accompanying drawings Fig. 1 shows an edge view of a square broach that embodies the invention. Fig. 2 shows a side view of the same. Fig. 3 is a section on the line 3—3 on Fig. 1. Fig. 4 is a section on the line 4—4 on Fig. 1. Fig. 5 is a section on the line 5—5 on Fig. 1. Fig. 6 is a section on the line 6—6 on Fig. 1. Fig. 7 is a view on much larger scale looking toward the bottom or round end of the broach.

The bar or body of the tool shown is formed of hardened tool steel and changes from square cross section of substantially the size and shape of the finished hole, at the head end 10, to round cross section of substantially the size and shape of the drilled hole that is to be enlarged, at the tip 11, the diameter of the circular end being equal to that of a circle 12 inscribed in a square 13 of the size of the head, as illustrated in Fig. 7. Cuts 14 are milled across the angular edges 15 of the bar, forming teeth 16 that face toward the round end. These cuts are staggered on adjacent corners so that the teeth in one row will not be in the same transverse plane as the teeth on the next row. This leaves a larger cross section at every point than if the teeth were all formed on the same transverse plane, and it also leaves wide lands 17 opposite the cuts, which lands engage the walls of the opening being formed and prevent a plate being broached from drifting sidewise. This also permits each tooth to be deeply undercut and each chip space to be quite large without materially weakening the bar, as is the case where the teeth are on the same transverse planes. The cuts are all of substantially the same size and this provides teeth which gradually change the shape of the hole from round to square. As only two teeth in a square broach. such as illustrated. are cutting in the same transverse plane the broach is easier to drive or pull through a hole than if four teeth were cutting in the same transverse plane, and with this formation the pitch of the teeth or the distance between them can be made practically double the distance they could if the teeth were opposite. Such teeth will be much stronger and consequently less likely to break. This also allows heavier cuts to be made.

This invention enables broaches to be made which can be driven by hand through metal plates, consequently they can be cheaply provided in sets for the use of mechanics who desire to make rectangular holes and do not have machines for the purpose.

The invention claimed is:—

1. A broach consisting of a bar that is angular at one end and circular at the other end, with milling cuts made across the edges of the bar, the cuts in the adjacent edges being staggered, whereby the cutting teeth on one edge will be in different transverse planes from the cutting teeth on the next edge.

2. A broach consisting of a bar that is angular at one end and circular at the other end, with cutting teeth formed on the edges of the bar and facing the round end, the teeth of the opposite rows being in the same transverse planes and the teeth in the intermediate rows being in different transverse planes.

VICTOR E. LA POINTE.